(12) United States Patent
Gocho et al.

(10) Patent No.: US 9,221,292 B2
(45) Date of Patent: Dec. 29, 2015

(54) LABEL, ADHESIVE LABEL, AND PRINTED PRODUCT

(71) Applicants: TOPPAN PRINTING CO., LTD., Tokyo (JP); SEIKO EPSON CORPORATION, Tokyo (JP)

(72) Inventors: Satoshi Gocho, Tokyo (JP); Atsushi Kijima, Tokyo (JP); Yoshihiro Koizumi, Suwa (JP); Masaru Takahashi, Suwa (JP); Takakazu Fukano, Suwa (JP)

(73) Assignees: TOPPAN PRINTING CO., LTD., Tokyo (JP); SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/227,665

(22) Filed: Mar. 27, 2014

(65) Prior Publication Data

US 2014/0210199 A1   Jul. 31, 2014

Related U.S. Application Data

(63) Continuation of application No. PCT/JP2012/068346, filed on Jul. 19, 2012.

(30) Foreign Application Priority Data

Sep. 29, 2011   (JP) .................................. 2011-213726

(51) Int. Cl.
*B42D 25/382* (2014.01)
*G06K 19/06* (2006.01)
(Continued)

(52) U.S. Cl.
CPC .............. *B42D 15/00* (2013.01); *B42D 25/382* (2014.10); *G06K 19/06* (2013.01); *G06K 19/0614* (2013.01); *G06K 19/10* (2013.01); *G09F 3/0294* (2013.01); *G09F 3/10* (2013.01); *G06K 19/06028* (2013.01)

(58) Field of Classification Search
CPC ....... G09K 19/10; G09K 19/06; B42D 25/382
USPC .......................................... 235/468; 116/216
See application file for complete search history.

(56) References Cited

U.S. PATENT DOCUMENTS 6,952,504 B2   10/2005   Bi et al.
7,656,084 B2   2/2010   Ishida
(Continued)

FOREIGN PATENT DOCUMENTS

JP   59-199757   11/1984
JP   62-243653   10/1987
(Continued)

OTHER PUBLICATIONS

Abstract of JP 06-187523 (IDS).*
(Continued)

*Primary Examiner* — Kyle Grabowski (57) ABSTRACT

A label includes an optical function layer configured to pass light of a certain wavelength, a light absorption pattern facing one major surface of the optical function layer and configured to absorb the light of the wavelength, and a light reflecting layer facing the other major surface of the optical function layer and configured to reflect the light of the wavelength. The light reflecting layer is configured to raise an absorbance at the wavelength when heated.

19 Claims, 6 Drawing Sheets

(51) Int. Cl.
*G06K 19/10* (2006.01)
*B42D 15/00* (2006.01)
*G09F 3/00* (2006.01)
*G09F 3/10* (2006.01)

(56) References Cited

U.S. PATENT DOCUMENTS

| | | | |
|---|---|---|---|
| 8,206,779 | B2 | 6/2012 | Suzuki et al. |
| 2010/0264640 | A1* | 10/2010 | Lane et al. ............... 283/67 |
| 2013/0083142 | A1 | 4/2013 | Minamikawa et al. |

FOREIGN PATENT DOCUMENTS

| | | |
|---|---|---|
| JP | 4-26922 | 6/1992 |
| JP | 4-189196 | 7/1992 |
| JP | 6-24140 | 2/1994 |
| JP | 6-187523 | 7/1994 |
| JP | 7-172050 | 7/1995 |
| JP | 10-100544 | 4/1998 |
| JP | 10-204363 | 8/1998 |
| JP | 2000-293108 | 10/2000 |
| JP | 2005-119228 | 5/2005 |
| JP | 2005-266147 | 9/2005 |

OTHER PUBLICATIONS

International Search Report mailed Sep. 18, 2012, in corresponding International Application No. PCT/JP2012/068346.
International Preliminary Report on Patentability and Written Opinion of the International Searching Authority mailed Apr. 10, 2014 in corresponding International Patent Application No. PCT/JP2012/068346.

\* cited by examiner

LABEL, ADHESIVE LABEL, AND PRINTED PRODUCT

CROSS-REFERENCE TO RELATED APPLICATIONS

This is a Continuation Application of PCT application No. PCT/JP2012/068346, filed on 2012 Jul. 19, which was published under PCT Article 21(2) in Japanese.

This application is based upon and claims the benefit of priority from prior Japanese Patent Application No. 2011-213726, filed on 2011 Aug. 29, the entire contents of which are incorporated herein by reference.

BACKGROUND OF THE INVENTION

1. Field of the Invention

The present invention relates to, for example, a label usable for an anti-counterfeit purpose, and an adhesive label and a printed product including the same.

2. Description of the Related Art

In recent years, counterfeit articles circulating on the market have developed into a serious social issue. As a countermeasure, for example, a label that enables authenticity confirmation is put on an article. Examples of such labels or so-called anti-counterfeit labels are a label including a printed layer formed by a functional ink such as fluorescent ink or OVI (Optically Variable Ink), a label including a printed layer formed by special printing such as microprinting or intaglio printing, a label including a hologram or a diffraction grating, a label in which information is written by magnetic recording, and a label including an IC (Integrated Circuit) tag.

Many anti-counterfeit labels are themselves difficult to counterfeit. However, some anti-counterfeit labels can relatively easily be peeled off articles on which they are put. Such labels may be used dishonestly by peeling such labels off used articles and putting them on counterfeit articles.

Some anti-counterfeit labels employ measures to make such reuse impossible.

For example, an anti-counterfeit label has a notch. Such an anti-counterfeit label is designed to tear from the notch position when ripped off an article on which it is put.

Another anti-counterfeit label uses a base that causes brittle fracture by a relatively small force. Such a label is also designed to break when ripped off an article on which it is put.

Still another anti-counterfeit label includes a brittle layer that causes brittle fracture by a relatively small force. The adhesive strength between the brittle layer and a layer adjacent on the observer side changes depending on the position. When this label is ripped off an article on which it is put, the brittle layer breaks in a pattern corresponding to the adhesive strength distribution. As a result, for example, the brittle layer and the like partially remain on the article with a pattern corresponding to a character string "VOID". A missing portion having a pattern corresponding to the character string "VOID" is formed in the brittle layer and the like of the anti-counterfeit label.

It is impossible or difficult to reuse such an anti-counterfeit label ripped off and released from an article. However, an organic solvent soaking into the adhesive layer or bonding layer may make it possible to release the anti-counterfeit label without damaging the label main body.

Some anti-counterfeit labels employ a technique of making this impossible or difficult.

For example, an anti-counterfeit label uses, as the material of an adhesive layer, a mixture of an adhesive and an additive insoluble in it (for example, see patent literature 1). When this anti-counterfeit label is released using an organic solvent, the surface of the adhesive layer becomes uneven due to the difference in solubility to the organic solvent between the adhesive and the additive.

Another anti-counterfeit label uses a printed layer containing a dye soluble in an organic solvent (for example, see patent literature 2). When this anti-counterfeit label is released using an organic solvent, the dye seeps from the printed layer.

Note that this label can be released without damage to the label main body or seepage of the dye when the surface is heated using a drier or the like. As an anti-counterfeit label taking a measure against the release by heating, there is, for example, an anti-counterfeit label using an adhesive layer containing foaming particles that foams when heated (for example, see patent literature 3).

It is impossible or difficult to reuse these anti-counterfeit labels released using an organic solvent or heat. However, after the expiration date of an article, the possibility that the anti-counterfeit label is removed together with the surface of the article on which it is put needs to be taken into consideration. The above-described measures cannot prevent reuse of an anti-counterfeit label removed in this way.

BRIEF SUMMARY OF THE INVENTION

It is an object of the present invention to make it possible to suppress reuse of a label put on an article after the expiration date of the article.

According to the first aspect of the present invention, there is provided a label comprising an optical function layer configured to pass light of a certain wavelength, a light absorption pattern facing one major surface of the optical function layer and configured to absorb the light of the wavelength, and a light reflecting layer facing the other major surface of the optical function layer and configured to reflect the light of the wavelength, wherein the light reflecting layer is configured to raise an absorbance at the wavelength when heated.

According to the second aspect of the present invention, there is provided the label according to the first aspect, wherein part of the light reflecting layer has a higher absorbance at the wavelength than that of another part of the light reflecting layer.

According to the third aspect of the present invention, there is provided the label according to the second aspect, wherein when illuminated with the light of the wavelength, a combination of at least part of the light absorption pattern and at least part of a portion of the light reflecting layer where the absorbance at the wavelength is raised by heating displays one piece of information.

According to the fourth aspect of the present invention, there is provided the label according to the second or third aspect, wherein when illuminated with the light of the wavelength, at least part of the light absorption pattern and at least part of a portion of the light reflecting layer where the absorbance at the wavelength is raised by heating display pieces of information independent of each other.

According to the fifth aspect of the present invention, there is provided the label according to any one of the first to fourth aspects, wherein the wavelength is in an infrared range, and the optical function layer comprises a black layer.

According to the sixth aspect of the present invention, there is provided the label according to the fifth aspect, wherein the wavelength is in a near infrared range, a transmittance of the optical function layer at the wavelength is not less than 30%, and a transmittance difference for a wavelength in one of a wavelength range of 700 to 800 nm of the near infrared range and a wavelength range of 800 to 1,500 nm of the near infrared range is not less than 10% in the optical function layer.

According to the seventh aspect of the present invention, there is provided an adhesive label comprising a label according to any one of the first to sixth aspects, and an adhesive layer facing a major surface of the label on a side of a light reflecting layer.

According to the eighth aspect of the present invention, there is provided a printed product comprising a label according to any one of the first to sixth aspects, a print base facing a major surface of the label on a side of a light reflecting layer, and an adhesive layer intervening between the label and the print base and configured so that the label can be put on the print base.

According to the present invention, it is possible to suppress reuse of a label put on an article after the expiration date of the article.

When the label according to the first aspect is heated, the absorbance of the light reflecting layer at the wavelength (to be referred to as a "first wavelength" hereinafter) rises. More specifically, before heating, a first portion of the label corresponding to the light absorption pattern has a lower reflectance at the first wavelength as compared to a second portion adjacent to it. For this reason, the label displays a first image of a pattern corresponding to the first portion before heating. When the light reflecting layer is heated, the reflectance of the second portion at the first wavelength lowers. Hence, after the entire label is heated, when illuminated with light of the first wavelength, the label displays the first image at a contrast ratio lower than before heating or does not display the first image. After the label is only partially heated, when illuminated with light of the first wavelength, the label displays a second image different from the first image. Hence, when invalidation processing of partially or wholly heating the label is performed after the expiration date of an article on which the label is put, an image displayed when the label put on the article whose authenticity is unknown is illuminated with light of the first wavelength is compared with an image displayed when the label before heating is illuminated with light of the first wavelength, thereby determining the authenticity of the article. It is therefore possible to discourage a person from committing dishonesty and thus suppress reuse of the label put on the article after the expiration date of the article.

In the label according to the second aspect, part of the light reflecting layer has a higher absorbance at the first wavelength than that of other part of the light reflecting layer. For this reason, the shape of an image displayed when the label is illuminated with light of the first wavelength before the expiration date of an article does not match the shape of the light absorption pattern. Hence, for example, when a label having the same material and layer structure as the label is put into circulation, if the absorbance of the light reflecting layer at the first wavelength is not partially raised, or the shape of the portion of the light reflecting layer where the absorbance at the first wavelength is raised is different from that of an authentic label, the label can be discriminated as a counterfeit by comparing the above-described images.

In the label according to the third aspect, concerning the label according to the second aspect, when illuminated with light of the first wavelength, a combination of at least part of the light absorption pattern and at least part of a portion of the light reflecting layer where the absorbance at the wavelength is raised by heating displays one piece of information. Normally, the portion of the light reflecting layer where the absorbance at the first wavelength is raised by heating has a reflectance spectrum different from that of the light absorption pattern. For this reason, an image displayed when they are illuminated with light of the first wavelength may be different from an image displayed when they are illuminated with a second wavelength different from the first wavelength. It is therefore difficult for a person who is unaware of use of light of the first wavelength to read the information.

In the label according to the fourth aspect, concerning the label according to the second or third aspect, when illuminated with the light of the first wavelength, at least part of the light absorption pattern and at least part of a portion of the light reflecting layer where the absorbance at the first wavelength is raised by heating display pieces of information independent of each other. As described above, it is therefore difficult for a person who is unaware of use of light of the first wavelength to read the information displayed by the portion of the light reflecting layer where the absorbance at the first wavelength is raised.

In the label according to the fifth aspect, the first wavelength is in an infrared range, and the optical function layer comprises a black layer. Note that "black" here indicates that the reflectance is 10% or less for all light components whose wavelengths fall within the range of 400 to 700 nm when the intensity of specular reflected light is measured.

Many materials used for the light reflecting layer develop or change a color when heated. When color development or color change of the light reflecting layer can be perceived by observation with the naked eye, a person who is committing dishonesty can easily notice that authenticity is determined using this label. In the label according to the fifth aspect, at least part of the light reflecting layer is hidden by the optical function layer.

Hence, when this portion is heated, a person who is committing dishonesty can hardly notice that authenticity is determined using this label.

In the label according to the sixth aspect, concerning the label according to the fifth aspect, the first wavelength is in a near infrared range, a transmittance of the optical function layer at the first wavelength is not less than 30%, and a transmittance difference for a wavelength in one of a wavelength range of 700 to 800 nm of the near infrared range and a wavelength range of 800 to 1,500 nm of the near infrared range is not less than 10% in the optical function layer. That is, the transmittance spectrum of the optical function layer in the near infrared range exhibits a high transmittance at the first wavelength. The transmittance difference for a wavelength in one of the wavelength range of 700 to 800 nm of the near infrared range and the wavelength range of 800 to 1,500 nm of the near infrared range is not more than 10%. It is therefore impossible or difficult for a person who is unaware of use of light of the first wavelength for authenticity determination to discriminate between the label before invalidation processing from that after invalidation processing. For this reason, a person who is committing dishonesty hardly notices that a measure against counterfeiting using the invalidation processing is taken.

An adhesive label according to the seventh aspect includes a label according to any one of the first to sixth aspects. The adhesive label is in a form usable when putting the label on an article.

A printed product according to the eighth aspect includes a label according to any one of the first to sixth aspects. The possibility that the label on the printed product is reused after its expiration date is low.

CITATION LIST

Patent Literatures

Patent Literature 1: Jpn. Pat. Appln. KOKAI Publication No. 2005-266147
Patent Literature 2: Jpn. Pat. Appln. KOKAI Publication No. 10-204363
Patent Literature 3: Jpn. Pat. Appln. KOKAI Publication No. 2000-293108

DETAILED DESCRIPTION OF THE INVENTION

An embodiment of the present invention will now be described in detail with reference to the accompanying drawings. Note that the same reference numerals denote constituent elements having the same or similar functions throughout the drawings, and a repeated description thereof will be omitted.

Figure 1:
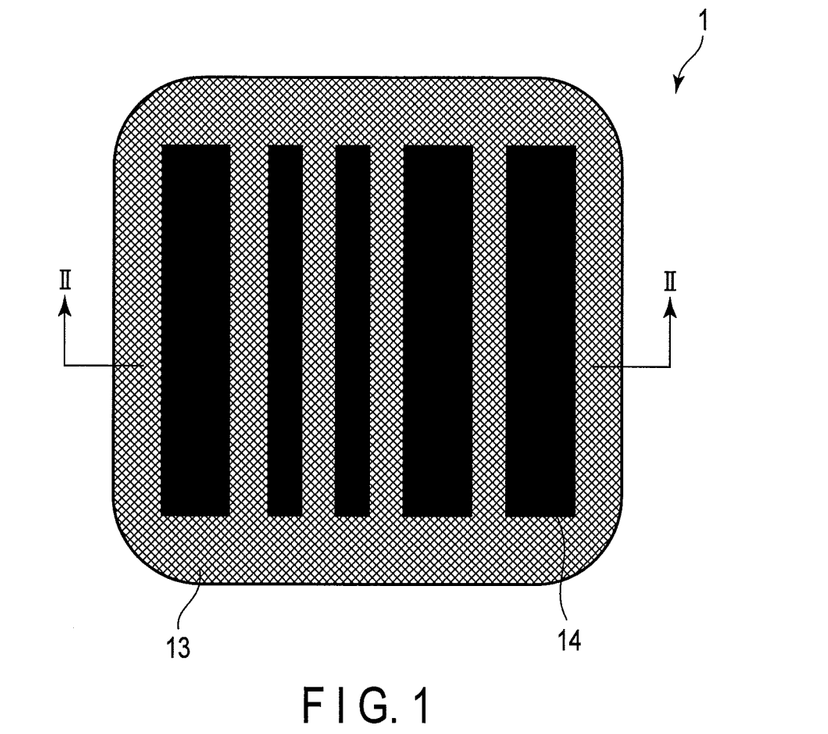
FIG. 1 is a plan view schematically showing a label according to an embodiment of the present invention.
Figure 2:
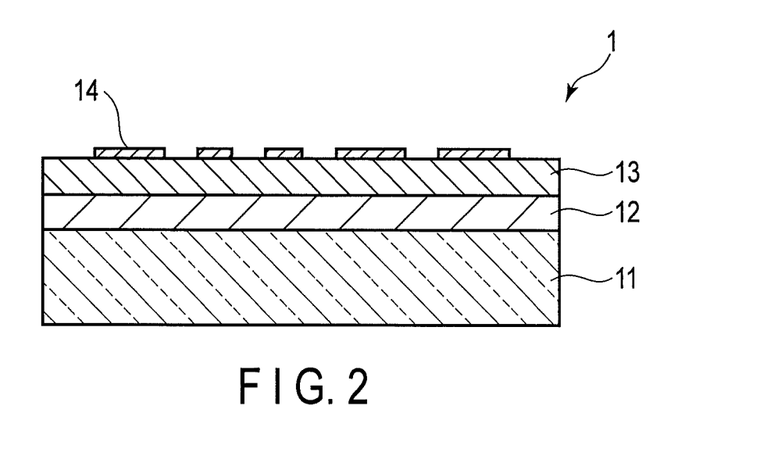
FIG. 2 is a sectional view of the label shown in FIG. 1 taken along a line II-II.

FIG. 1 is a plan view schematically showing a label according to an embodiment of the present invention. FIG. 2 is a sectional view of the label shown in FIG. 1 taken along a line II-II.

A label 1 shown in FIGS. 1 and 2 includes a base 11, a light reflecting layer 12, an optical function layer 13, and a light absorption pattern 14. The light reflecting layer 12, the optical function layer 13, and the light absorption pattern 14 are stacked on the base 11 in this order. The label 1 has a front surface on the side of the light absorption pattern 14 and a back surface on the side of the base 11.

The light absorption pattern 14, the optical function layer 13, and the light reflecting layer 12 may be stacked on the base 11 in this order. In this case, the label 1 has a front surface on the side of the base 11 and a back surface on the side of the light reflecting layer 12.

The base 11 is, for example, a film made of a resin. As the resin, plastics such as polyethylene terephthalate, polyethylene naphthalate, polypropylene, polycarbonate, and polyethylene are usable. The base is typically transparent but may be opaque like aluminum foil. However, when the label 1 has the front surface on the side of the base 11, a material that passes light of a first wavelength or typically light of a first wavelength and a second wavelength different from each other is used as the base 11.

The base 11 can have a single layer structure or a multilayer structure. The base 11 can be omitted.

The light reflecting layer 12 is provided on one major surface of the base 11.

The light reflecting layer 12 reflects light of the first wavelength at least during a period from completion of the label 1 to heating to an invalidation temperature (that is, the temperature of a heat treatment as invalidation processing) or more. The light reflecting layer 12 is configured to increase the absorbance at the first wavelength when heated; for example, heated to the invalidation temperature or more.

Immediately after the manufacture of the label 1, a reflectance R1 of the light reflecting layer 12 with respect to light of the first wavelength falls within the range of, for example, 50% to 100%, and typically falls within the range of 60% to 80%. After invalidation processing, a reflectance R2 of the light reflecting layer 12 with respect to light of the first wavelength falls within the range of, for example, 0% to 30%, and typically falls within the range of 5% to 20%. The ratio of the reflectance R2 to the reflectance R1 falls within the range of, for example, 0.6 or less, and typically falls within the range of 0.06 to 0.33.

The light reflecting layer 12 contains a heat-sensitive color former that develops a color when heated to, for example, the invalidation temperature or more. The heat-sensitive color former is colorless during a period until it is heated to, for example, the invalidation temperature or more, and develops a color when heated to the invalidation temperature or more. Alternatively, the heat-sensitive color former has a color during a period until it is heated to, for example, the invalidation temperature or more, and changes the color when heated to the invalidation temperature or more. Note that when the light reflecting layer 12 contains a heat-sensitive color former, it typically develops or changes a color when heated to the invalidation temperature or more.

For example, assume that the light reflecting layer 12 contains a heat-sensitive color former that raises the absorbance in at least a partial wavelength range of the near infrared range by developing or changing a color. "Near infrared range" is assumed here to indicate a wavelength range of 700 to 1,500 nm. The first wavelength is assumed to be within a wavelength range of the near infrared range where the absorbance is raised by developing or changing a color.

As the heat-sensitive color former, for example, a combination of a dye such as a leuco dye and a developer is usable. Alternatively, a heat-sensitive color developing compound such as a fluorine compound described in Jpn. Pat. Appln. KOKAI Publication No. 59-199757 or a divinyl compound described in Jpn. Pat. Appln. KOKAI Publication No. 62-243653 is usable. Otherwise, for example, a heat-sensitive color developing composition described in Jpn. Pat. Appln. KOKAI Publication No. 6-24140, 7-172050, 10-100544, or the like may be used.

The light reflecting layer 12 can further contain another component. For example, the light reflecting layer 12 may further contain a resin as a dispersion medium that disperses the heat-sensitive color former. As the resin, for example, a material generally used in a process ink is usable.

The light reflecting layer 12 is formed by, for example, a printing method. Examples of the printing method are offset printing, gravure printing, screen printing, and flexographic printing. The thickness of the light reflecting layer 12 falls within the range of, for example, 1 to 20 µm, and typically falls within the range of 3 to 15 µm.

The optical function layer 13 is provided on the light reflecting layer 12. The optical function layer 13 passes light of the first wavelength. The transmittance of the optical function layer 13 with respect to light of the first wavelength is, for example, 30% or more, and typically falls within the range of 30% to 60%.

The optical function layer 13 is typically colored. When the optical function layer 13 is colored, and especially when the optical function layer 13 is colored black, it is impossible or difficult to perceive the color development or color change of the light reflecting layer 12 upon heating only by observing the label 1 from the front surface side by the naked eye. That is, when the optical function layer 13 is colored, it is difficult to notice that invalidation processing (to be described later) has been performed. For example, assume here that the optical function layer 13 looks black.

When the first wavelength is within the near infrared range, a material whose transmittance at the first wavelength is 30% or more and in which the transmittance difference for a wavelength in one of the wavelength range of 700 to 800 nm of the near infrared range and the wavelength range of 800 to 1,500 nm of the near infrared range is 10% or more may be used as the optical function layer 13.

The optical function layer 13 having the above-described optical characteristic, that is, the optical characteristic of selectively passing light in a partial wavelength range of light in the near infrared range and absorbing the remaining light contains, for example, a predetermined near infrared absorbent and a resin. As the near infrared absorbent, for example, at least one material selected from the group consisting of phthalocyanine compounds, naphthalocyanine compounds, anthraquinone compounds, giimonium compounds, and cyanine compounds is usable. As the resin, for example, a material generally used in a process ink is usable.

The optical function layer 13 is formed by, for example, a printing method. Examples of the printing method are offset printing, gravure printing, screen printing, and flexographic printing. The thickness of the optical function layer 13 falls within the range of, for example, 0.5 to 10 µm, and typically falls within the range of 1 to 5 µm.

The light absorption pattern 14 is provided on the optical function layer 13. The light absorption pattern 14 faces part of the light reflecting layer 12 while sandwiching the optical function layer 13 between them. In the example shown in FIGS. 1 and 2, the light absorption pattern 14 forms a one-dimensional code. The light absorption pattern 14 may form a two-dimensional code. Alternatively, the light absorption pattern 14 may form another pattern such as a character, a symbol, a design, or a graphic.

The light absorption pattern 14 absorbs light of the first wavelength. More specifically, the absorbance of the light absorption pattern 14 at the first wavelength is higher than the absorbance of the light reflecting layer 12 at the first wavelength and the absorbance of the optical function layer 13 at the first wavelength immediately after the manufacture of the label 1. The absorbance of the light absorption pattern 14 with respect to light of the first wavelength is, for example, 70% or more, and typically, 80% or more.

When the first wavelength is within the near infrared range, the light absorption pattern 14 contains, for example, a near infrared absorbent and a resin. As the resin, for example, a material generally used in a process ink is usable.

The near infrared absorbent used here is typically different from the near infrared absorbent used in the optical function layer 13 in the absorption spectrum within the near infrared range. For example, the near infrared absorbent used here has a higher absorbance with respect to light of the first wavelength as compared to the near infrared absorbent used in the optical function layer 13. As the near infrared absorbent, for example, carbon black used in a process India ink is usable. Alternatively, the compounds exemplified as the near infrared absorbent of the optical function layer 13 are usable as the near infrared absorbent.

The light absorption pattern 14 preferably has the same color as the optical function layer 13 or a light color as long as it exhibits a sufficient absorbance with respect to light of the first wavelength. This makes it difficult to notice the existence of the light absorption pattern 14 when the label 1 is observed by the naked eye.

The light absorption pattern 14 is preferably distributed all over a region corresponding to the light reflecting layer 12. This can make it difficult to analyze a spectral characteristic of the optical function layer 13.

The light absorption pattern 14 is formed by, for example, a printing method. Examples of the printing method are offset printing, gravure printing, screen printing, and flexographic printing. Alternatively, the light absorption pattern 14 may be formed using a thermal transfer ribbon, inkjet printing, or laser printing. The thickness of the light absorption pattern 14 falls within the range of, for example, 0.5 to 10 µmand typically falls within the range of 0.5 to 2 µm.

An authenticity determination method using the label 1 will be described next.

An image display system usable for authenticity determination when the label 1 is used as an anti-counterfeit label will be described first.

Figure 3:
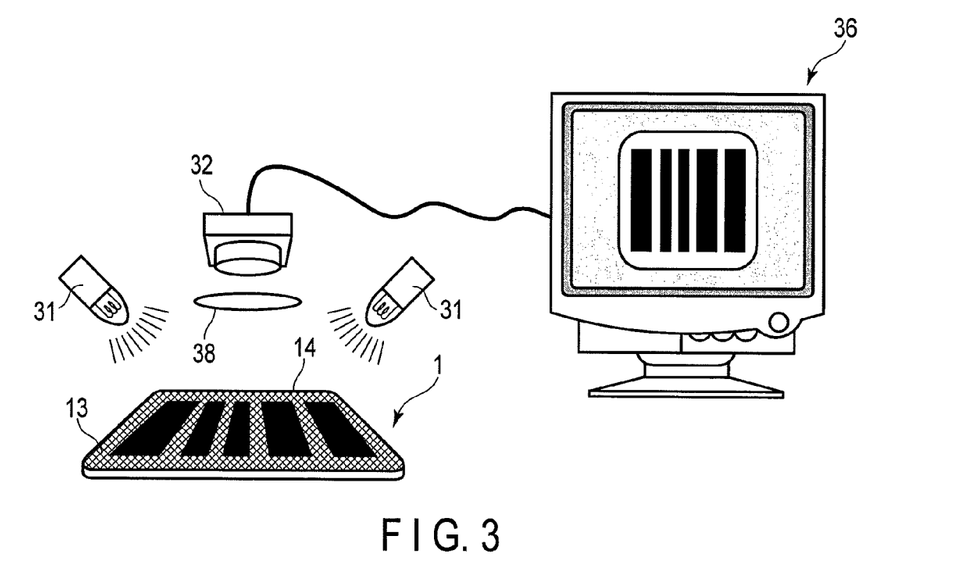
FIG. 3 is a view schematically showing an example of an image display system usable for authenticity determination.

FIG. 3 is a view schematically showing an example of an image display system usable for authenticity determination.

The system shown in FIG. 3 includes two light sources 31, an image capturing apparatus 32, an image display apparatus 36, and an optical filter 38.

The light sources 31 are, for example, infrared LEDs (Light-Emitting Diodes). The light sources 31 are disposed diagonally above the label 1 placed on a table (not shown) with its front surface facing up. One of the light sources 31 may be omitted. Three or more light sources 31 may be provided. When a plurality of light sources 31 are provided, light components emitted by the light sources 31 can have the same spectrum or different spectra. In the latter case, for example, an arrangement may be employed in which the light source 31 that emits light of the first wavelength and the light source 31 that emits light of a second wavelength are arranged, and they can alternately be turned on.

The image capturing apparatus 32 is, for example, a CCD (Charge-Coupled Device) camera. The image capturing apparatus 32 is arranged to face the front surface of the label 1.

The image display apparatus 36 is connected to the image capturing apparatus 32. The image display apparatus 36 displays an image captured by the image capturing apparatus 32.

The optical filter 38 passes light components of the first and second wavelengths, and absorbs at least some of the remaining wavelengths. For example, the optical filter 38 is a visible light cut filter that absorbs visible light and passes at least part of infrared light. The optical filter 38 is disposed between the label 1 and the image capturing apparatus 32.

Figure 4:
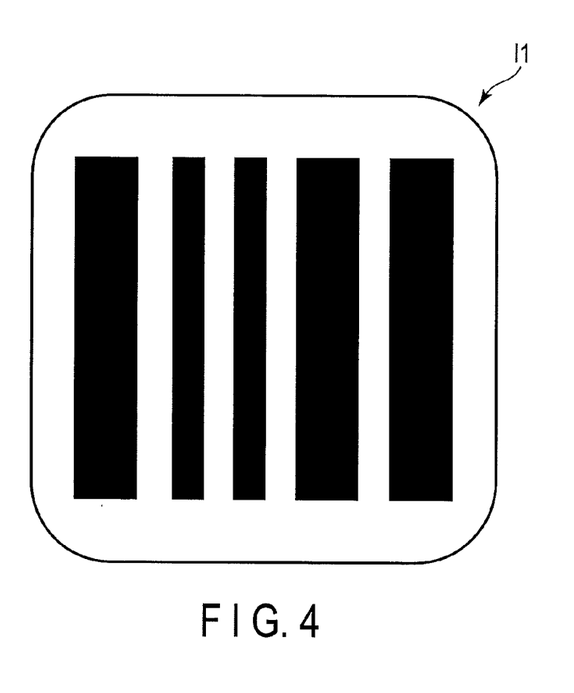
FIG. 4 is a view schematically showing an example of an image obtained when information recorded in the label shown in FIGS. 1 and 2 is visualized by the image display system shown in FIG. 3.

FIG. 4 is a view schematically showing an example of an image obtained when information recorded in the label shown in FIGS. 1 and 2 is visualized by the image display system shown in FIG. 3.

When the front surface of the label 1 immediately after the manufacture is observed by the naked eye, it looks, for example, completely black. On the other hand, when the label 1 immediately after the manufacture is captured by the image capturing apparatus 32 while being illuminated with light of the first wavelength emitted by the light sources 31 using the system shown in FIG. 3, the image display apparatus 36 displays an image I1 including black regions corresponding to the light absorption pattern 14 and white regions corresponding to the other portions of the label 1. That is, in this case, a latent image can be visualized, for example, a visible image having a PCS (Print Contrast Signal) value of 0.75 or more can be displayed.

Note that when the light source 31 that emits light of the first wavelength is turned off, and the light source 31 that emits light of the second wavelength is turned on, the image display apparatus 36 displays, for example, an image that looks black as a whole or the image I1 having a lower contrast ratio, for example, a PCS value smaller than 0.75. Invalidation processing of the label 1 will be described next.

Figure 5:
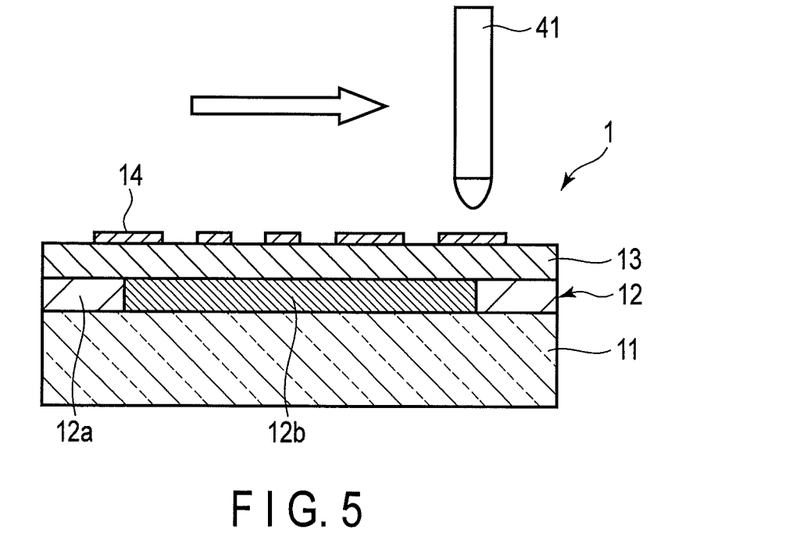
FIG. 5 is a view schematically showing an example of an invalidation processing method of the label shown in FIGS. 1 and 2.

FIG. 5 is a view schematically showing an example of the invalidation processing method of the label shown in FIGS. 1 and 2.

In the invalidation processing method shown in FIG. 5, a thermal head 41 is brought into contact with or scanned on the label 1, thereby heating at least part of the light reflecting layer 12. FIG. 5 shows an example in which only part of the light reflecting layer 12 is heated.

When this invalidation processing is performed, the absorbance of the light reflecting layer 12 at the first wavelength rises at a position where the thermal head 41 comes into contact with the label 1. As a result, an unheated portion 12a where the absorbance of the light reflecting layer 12 at the first wavelength remains the same as that before the invalidation processing and a heated portion 12b where the absorbance of the light reflecting layer 12 at the first wavelength is higher than that before the invalidation processing are formed in the light reflecting layer 12.

Note that as described above, the light reflecting layer 12 may develop or change a color when heated. When the color change of the light reflecting layer 12 is small, or when the visible light transmittance of the optical function layer 13 is low, it is impossible or difficult to discriminate any difference in the color of the light reflecting layer 12 before and after the invalidation processing by observation with the naked eye.

Figure 6:
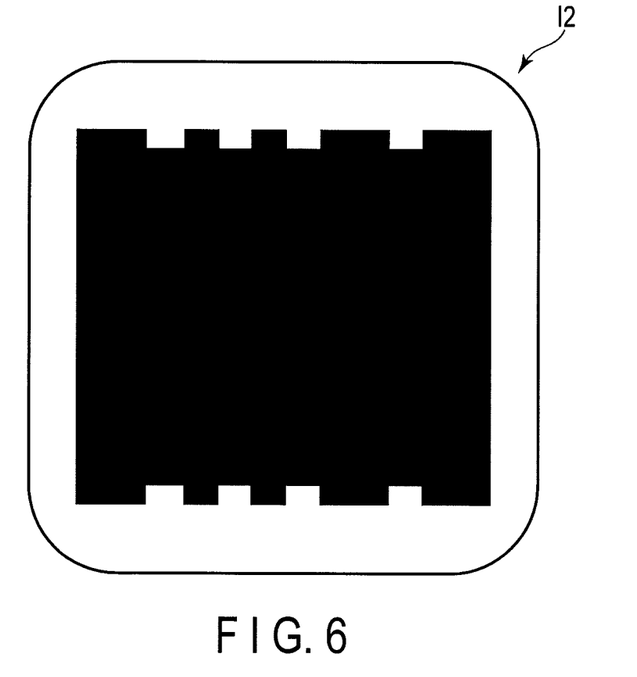
FIG. 6 is a view schematically showing an example of an image obtained when information recorded in a label invalidated by the method shown in FIG. 5 is visualized by the image display system shown in FIG. 3.

FIG. 6 is a view schematically showing an example of an image obtained when information recorded in a label invalidated by the method shown in FIG. 5 is visualized by the image display system shown in FIG. 3.

When the label 1 after invalidation processing is captured by the image capturing apparatus 32 while being illuminated with light of the first wavelength emitted by the light sources 31 using the system shown in FIG. 3, the image display apparatus 36 displays an image I2 including black regions corresponding to the light absorption pattern 14 or the heated portion 12b and white regions corresponding to the other portions of the label 1. That is, in this case, the image display apparatus 36 displays the image I2 different from the image I1 in FIG. 4.

Regarding the image I2, a first region corresponding to the light absorption pattern 14 and a second region corresponding to a portion of the heated portion 12b which does not face the light absorption pattern 14 can have equal or different brightnesses. In the latter case, when a region of the image I1 corresponding to the first region is defined as a third region, and a region corresponding to the second region is defined as a fourth region, the contrast ratio of the first and second regions need only be lower than that of the third and fourth regions.

The above-described label 1 can be modified in various ways.

Figure 7:
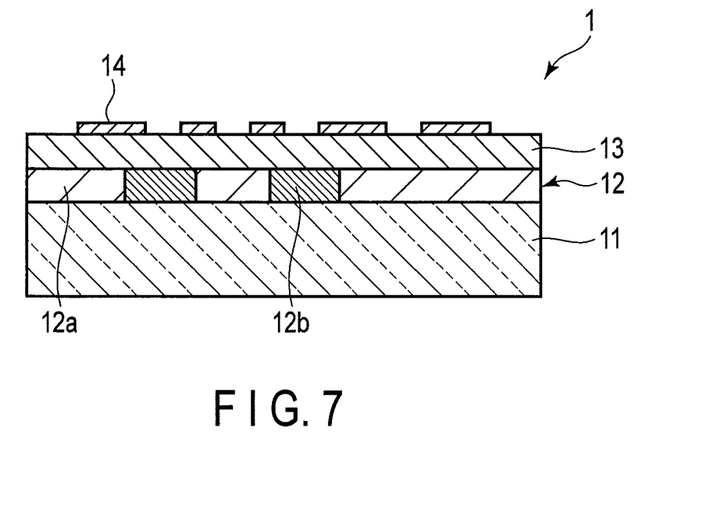
FIG. 7 is a sectional view schematically showing a modification of the label shown in FIGS. 1 and 2.
Figure 8:
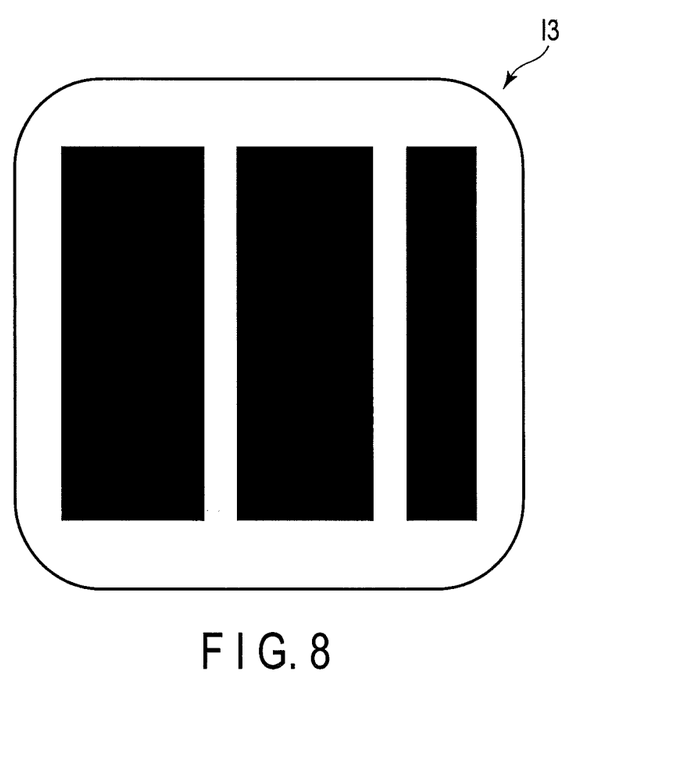
FIG. 8 is a view schematically showing an example of an image obtained when information recorded in the label shown in FIG. 7 is visualized by the image display system shown in FIG. 3.

FIG. 7 is a sectional view schematically showing a modification of the label shown in FIGS. 1 and 2. FIG. 8 is a view schematically showing an example of an image obtained when information recorded in the label shown in FIG. 7 is visualized by the image display system shown in FIG. 3.

The label 1 shown in FIG. 7 is the same as the label 1 described with reference to FIGS. 1 and 2 except that the following arrangement is employed. More specifically, in the label 1, the light reflecting layer 12 is partially heated to provide the unheated portions 12a and the heated portions 12b in the light reflecting layer 12.

When the label 1 shown in FIG. 7 is captured by the image capturing apparatus 32 while being illuminated with light of the first wavelength emitted by the light sources 31 using the system shown in FIG. 3, the image display apparatus 36 displays an image I3 including black regions corresponding to the light absorption pattern 14 or the heated portions 12b and white regions corresponding to the other portions of the label 1. That is, in this case, the image display apparatus 36 displays the image I3 different from the image displayed by the label 1 when observed by the naked eye. For this reason, for example, the image displayed by the label 1 when observed by the naked eye can be used as dummy information.

Note that in the example shown in FIG. 7, the heated portions 12b and the light absorption pattern 14 are arranged such that the orthogonal projections of the heated portions 12b to the major surface of the base 11 and that of the light absorption pattern 14 to the major surface are located in the same region. That is, in the example shown in FIG. 7, an arrangement in which a combination of at least part of the light absorption pattern 14 and at least part of the heated portions 12b displays one piece of information is employed.

Instead, the heated portions 12b and the light absorption pattern 14 may be arranged such that the orthogonal projections of the heated portions 12b to the major surface of the base 11 and that of the light absorption pattern 14 to the major surface are located in different regions. That is, an arrangement in which at least part of the light absorption pattern 14 and at least part of the heated portions 12b display pieces of information independent of each other may be employed.

A reference example will be explained here.

Figure 9:
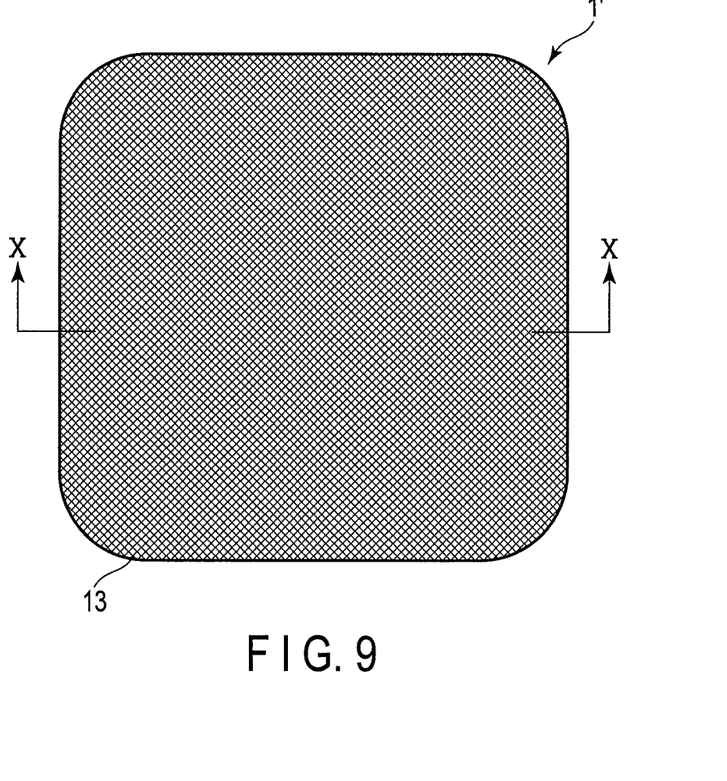
FIG. 9 is a plan view schematically showing a label according to a reference example.
Figure 10:
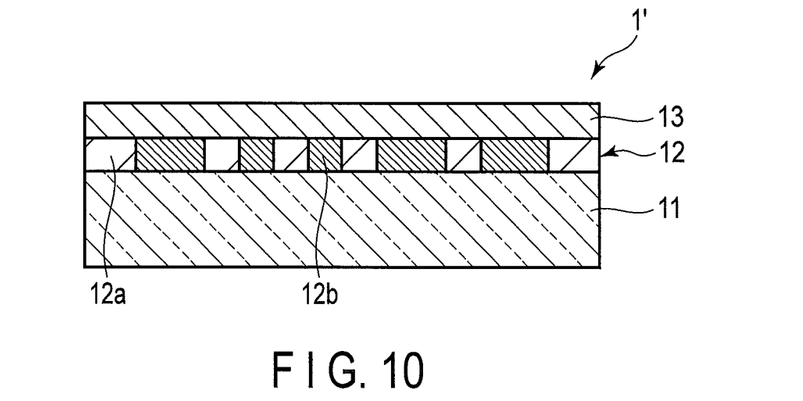
FIG. 10 is a sectional view of the label shown in FIG. 9 taken along a line X-X.

FIG. 9 is a plan view schematically showing a label according to a reference example. FIG. 10 is a sectional view of the label shown in FIG. 9 taken along a line X-X.

A label 1' shown in FIGS. 9 and 10 has almost the same structure as the label 1 described with reference to FIG. 7 except that the light absorption pattern 14 is omitted.

The label 1' displays an image that looks black as a whole when observed by the naked eye. When the label 1' is captured by the image capturing apparatus 32 while being illuminated with light of the first wavelength emitted by the light sources 31 using the system shown in FIG. 3, the image display apparatus 36 displays the image I3 including black regions corresponding to the heated portions 12b and white regions corresponding to the unheated portions 12a. That is, in this case, the image display apparatus 36 displays an image different from the image displayed by the label 1' when observed by the naked eye.

In the invalidation processing of the label 1', the unheated portions 12a are partially changed to the heated portions 12b. When the label 1' after the invalidation processing is captured by the image capturing apparatus 32 while being illuminated with light of the first wavelength emitted by the light sources 31 using the system shown in FIG. 3, the image display apparatus 36 displays the image I3 including black regions corresponding to the heated portions 12b and white regions corresponding to the unheated portions 12a. Since the heated portions 12b expand upon invalidation processing, the image displayed by the image display apparatus 36 after the invalidation processing is different from that displayed by the image display apparatus 36 before the invalidation processing.

As described above, when the light absorption pattern 14 is omitted, the effect derived from it cannot be the obtained. However, other effects can be obtained.

An adhesive label and a printed product including the above-described label 1 will be described next.

Figure 11:
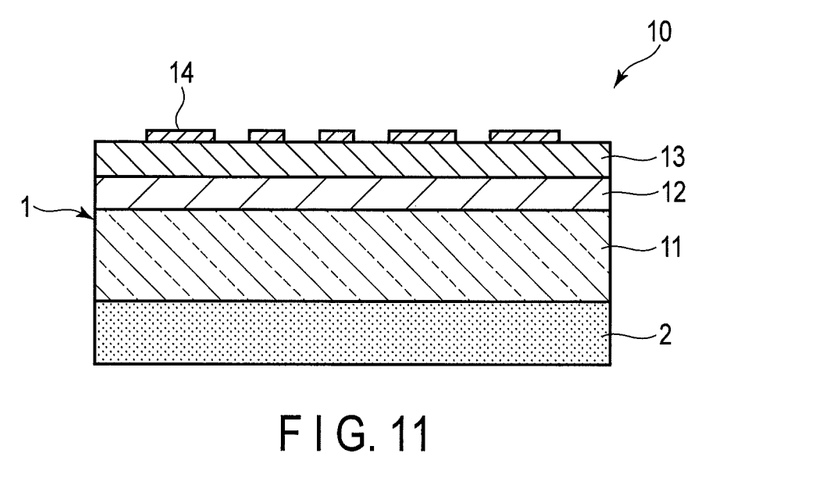
FIG. 11 is a sectional view schematically showing an example of an adhesive label.

FIG. 11 is a sectional view schematically showing an example of an adhesive label.

An adhesive label 10 shown in FIG. 11 includes the label 1 described with reference to FIGS. 1 and 2, and an adhesive layer 2. The adhesive layer 2 is provided on the back surface of the label 1.

The adhesive label 10 is put on, for example, an article desired to be confirmed as authentic. Note that the adhesive label 10 may further include a release paper that releasably covers the surface of the adhesive layer 2.

Figure 12:
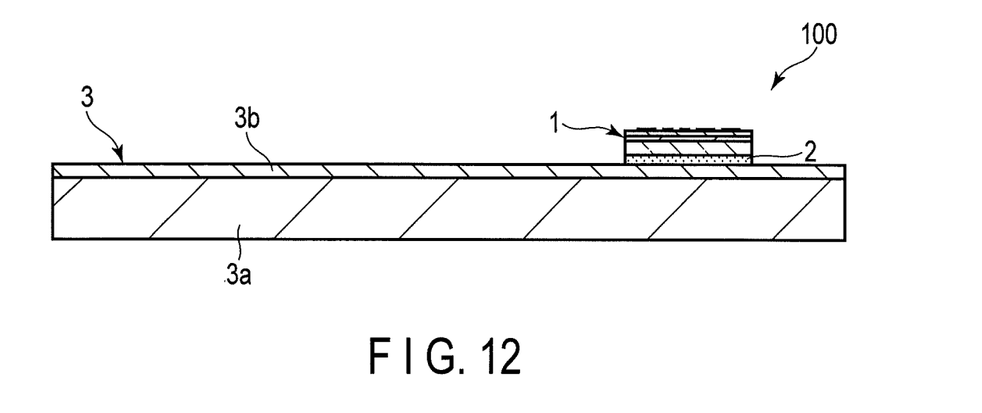
FIG. 12 is a sectional view schematically showing an example of a printed product.

FIG. 12 is a sectional view schematically showing an example of a printed product.

A printed product 100 shown in FIG. 12 includes the label 1 described with reference to FIGS. 1 and 2, the adhesive layer 2, and a printed product main body 3. The label 1 is put on the printed product main body 3 via the adhesive layer 2.

The printed product main body 3 includes a print base 3a and a printed layer 3b.

The print base 3a is made of, for example, paper, plastic, wood, glass, or resin. The print base 3a can have a single layer structure or a multilayer structure. The print base 3a can have a layer shape or another shape.

The printed layer 3b is provided on the print base 3a. The printed layer 3b can wholly or only partially cover the print base 3a.

Assume that the above-described invalidation processing is performed for the printed product 100 after its expiration date. This makes it possible to discriminate, for a printed product whose authenticity is unknown, whether the label 1 is reused by using, for example, the image display system described with reference to FIG. 3. That is, it is possible to do authenticity determination for a printed product whose authenticity is unknown. It is therefore possible to discourage a person from committing dishonesty and thus suppress reuse of a label put on an article after the expiration date of the article. As a result, counterfeiting of the printed product 100 can be suppressed.

EXAMPLES

Examples of the present invention will be described below.

Example 1

The label 1 described with reference to FIGS. 1 and 2 was manufactured by the following method.

White high-quality tacking paper was prepared as the base 11. An ink A having a composition to be described below was applied all over one major surface of the base 11 using a bar coater such that the dried film thickness became 10 μm. The coating film was dried to obtain the light reflecting layer 12.

An ink B having a composition to be described below was printed all over the light reflecting layer 12 by offset printing such that the dried film thickness became 1 μm. The coating film was irradiated with UV rays. The optical function layer 13 was thus obtained.

After that, a process India ink was printed on the optical function layer 13 such that the dried film thickness became 0.5 μm, thereby forming the light absorption pattern 14 serving as a two-dimensional code pattern. The label 1 was completed in the above-described way.

[Composition of Ink A]
Infrared absorbing leuco dye (NIR BLACK78: available from Yamada Chemical)
1 part by mass
Developer (TG-SH(H): available from Nippon Kayaku)
7 parts by mass
Water-borne resin (hydran AP-40: available from DIC)
12 parts by mass

[Composition of Ink B]
Organic blue pigment (available from Mikuni Color)
5 parts by mass
Organic red pigment (available from Mikuni Color)
7 parts by mass
Organic yellow pigment (available from Mikuni Color)
8 parts by mass
UV curing offset ink medium (FD Karton ACE medium: available from Toyo Ink)
80 parts by mass When the front surface of the label 1 was observed by the naked eye, it looked black as a whole.

When the label 1 was captured by the image capturing apparatus 32 while being illuminated with light of the first wavelength, in this case, light of a wavelength of 800 nm emitted by the light sources 31 using the system shown in FIG. 3, the image display apparatus 36 displayed an image including a black two-dimensional code pattern and a white background. That is, the label displayed a mechanically readable image.

Next, invalidation processing was performed for the label 1. More specifically, as described with reference to FIG. 5, the thermal head 41 heated the label 1 to about 120° C. from its front surface side. When the label 1 was observed by the naked eye from the back surface side, color development of the light reflecting layer could be confirmed.

When the label 1 was captured by the image capturing apparatus 32 while being illuminated with light of the first wavelength, in this case, light of a wavelength of 800 nm emitted by the light sources 31 using the system shown in FIG. 3, the image display apparatus 36 displayed an image in which a region corresponding to the light absorption pattern 14 or the heated portion 12b looked black. That is, it was impossible to correctly read the two-dimensional code pattern.

Example 2

The label 1 described with reference to FIGS. 1 and 2 was manufactured by the following method.

White high-quality tacking paper was prepared as the base 11. The above-described ink A was applied all over one major surface of the base 11 using a bar coater such that the dried film thickness became 10 μm. The coating film was dried to obtain the light reflecting layer 12. An ink C having a composition to be described below was printed all over the light reflecting layer 12 by offset printing such that the dried film thickness became 1 μm. The coating film was irradiated with UV rays. The optical function layer 13 was thus obtained.

After that, a process india ink was printed on the optical function layer 13 such that the dried film thickness became 0.5 μm, thereby forming the light absorption pattern 14 serving as a two-dimensional code pattern. The label 1 was completed in the above-described way.

[Composition of Ink C]

Organic blue pigment (available from Mikuni Color)
5 parts by mass
Organic red pigment (available from Mikuni Color)
7 parts by mass
Organic yellow pigment (available from Mikuni Color)
8 parts by mass
infrared absorbent (YKR-3081: available from Yamamoto Chemicals)
5 parts by mass
UV curing offset ink medium (FD Karton ACE medium: available from Toyo Ink)
75 parts by mass When the front surface of the label 1 was observed by the naked eye, it looked black as a whole.

When the label 1 was captured by the image capturing apparatus 32 while being illuminated with light of the first wavelength, in this case, light of a wavelength of 800 nm emitted by the light sources 31 using the system shown in FIG. 3, the image display apparatus 36 displayed an image including a black two-dimensional code pattern and a white background. That is, the label displayed a mechanically readable image.

However, when the label 1 was captured by the image capturing apparatus 32 while being illuminated with light of the second wavelength, in this case, light of a wavelength of 940 nm emitted by the light sources 31 using the system shown in FIG. 3, the image display apparatus 36 displayed an image including a black two-dimensional code pattern and a gray background. That is, the contrast ratio lowered as compared to the case in which the label was illuminated with light of a wavelength of 800 nm, and the two-dimensional code pattern could not mechanically be read.

Next, invalidation processing was performed for the label 1. More specifically, as described with reference to FIG. 5, the thermal head 41 heated the label 1 to about 120° C. from its front surface side. When the label 1 was observed by the naked eye from the back surface side, color development of the light reflecting layer could be confirmed.

When the label 1 was captured by the image capturing apparatus 32 while being illuminated with light of the first wavelength, in this case, light of a wavelength of 800 nm emitted by the light sources 31 using the system shown in FIG. 3, the image display apparatus 36 displayed an image in which a region corresponding to the light absorption pattern 14 or the heated portion 12b looked black. That is, it was impossible to correctly read the two-dimensional code pattern.

What is claimed is:

1. A label comprising:
an optical function layer configured to pass light of a certain wavelength, the wavelength being in a near infrared range, and the optical function layer having an optical characteristic of selectively passing light in a partial wavelength range of the light in the near infrared range and absorbing the remaining light in the near infrared range;
a light absorption pattern facing one major surface of the optical function layer and configured to absorb the light of the wavelength; and
a light reflecting layer facing the other major surface of the optical function layer and configured to reflect the light of the wavelength,
wherein the light reflecting layer is configured to raise an absorbance at the wavelength when heated.

2. The label according to claim 1, wherein part of the light reflecting layer has a higher absorbance at the wavelength than that of other part of the light reflecting layer.

3. The label according to claim 2, wherein when illuminated with the light of the wavelength, a combination of at least part of the light absorption pattern and at least part of a portion of the light reflecting layer where the absorbance at the wavelength is raised by heating displays one piece of information.

4. The label according to claim 2, wherein when illuminated with the light of the wavelength, at least part of the light absorption pattern and at least part of a portion of the light reflecting layer where the absorbance at the wavelength is raised by heating display pieces of information independent of each other.

5. The label according to claim 1, wherein the optical function layer comprises a black layer.

6. The label according to claim 5, wherein a transmittance of the optical function layer at the wavelength is not less than 30%, and a transmittance difference for a wavelength in one of a wavelength range of 700 to 800 nm of the near infrared range and a wavelength range of 800 to 1,500 nm of the near infrared range is not less than 10% in the optical function layer.

7. An adhesive label comprising:
the label according to claim 1; and
an adhesive layer facing a major surface of the label on a side of a light reflecting layer.

8. A printed product comprising:
the label according to claim 1;
a print base facing a major surface of the label on a side of a light reflecting layer; and
an adhesive layer intervening between the label and the print base and configured to put the label on the print base.

9. An adhesive label comprising:
the label according to claim 2; and
an adhesive layer facing a major surface of the label on a side of a light reflecting layer.

10. An adhesive label comprising:
the label according to claim 3; and
an adhesive layer facing a major surface of the label on a side of a light reflecting layer.

11. An adhesive label comprising:
the label according to claim 4; and
an adhesive layer facing a major surface of the label on a side of a light reflecting layer.

12. An adhesive label comprising:
the label according to claim 5; and
an adhesive layer facing a major surface of the label on a side of a light reflecting layer.

13. An adhesive label comprising:
the label according to claim 6; and
an adhesive layer facing a major surface of the label on a side of a light reflecting layer.

14. A printed product comprising:
the label according to claim 2;
a print base facing a major surface of the label on a side of a light reflecting layer; and an adhesive layer intervening between the label and the print base and configured to put the label on the print base.

15. A printed product comprising:
the label according to claim 3;
a print base facing a major surface of the label on a side of a light reflecting layer; and
an adhesive layer intervening between the label and the print base and configured to put the label on the print base.

16. A printed product comprising:
the label according to claim 4;
a print base facing a major surface of the label on a side of a light reflecting layer; and
an adhesive layer intervening between the label and the print base and configured to put the label on the print base.

17. A printed product comprising:
the label according to claim 5;
a print base facing a major surface of the label on a side of a light reflecting layer; and
an adhesive layer intervening between the label and the print base and configured to put the label on the print base.

18. A printed product comprising:
the label according to claim 6;
a print base facing a major surface of the label on a side of a light reflecting layer; and
an adhesive layer intervening between the label and the print base and configured to put the label on the print base.

19. A label comprising:
an optical function layer configured to pass light of a certain wavelength;
a light absorption pattern facing one major surface of the optical function layer and configured to absorb the light of the wavelength; and
a light reflecting layer facing the other major surface of the optical function layer and configured to reflect the light of the wavelength,
wherein the light reflecting layer is configured to raise an absorbance at the wavelength when heated,
the optical function layer comprises a black layer, and
the wavelength is in a near infrared range, a transmittance of the optical function layer at the wavelength is not less than 30%, and a transmittance difference for a wavelength in one of a wavelength range of 700 to 800 nm of the near infrared range and a wavelength range of 800 to 1,500 nm of the near infrared range is not less than 10% in the optical function layer.

* * * * *